July 17, 1934.    G. F. COUCH    1,966,924
JOURNAL BOX
Filed Nov. 11, 1929    3 Sheets-Sheet 2
Fig. 3.
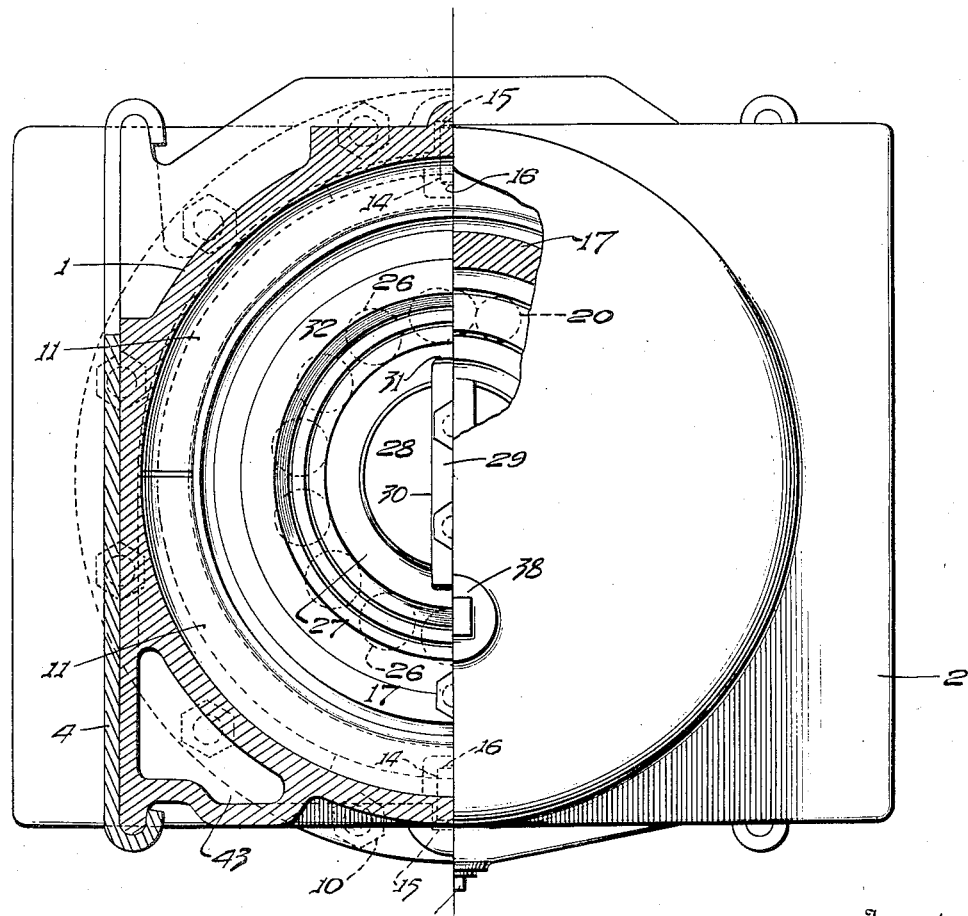
Inventor
Glenn F. Couch
By 
Attorney July 17, 1934.　　　G. F. COUCH　　　1,966,924
JOURNAL BOX
Filed Nov. 11, 1929　　　3 Sheets-Sheet 3
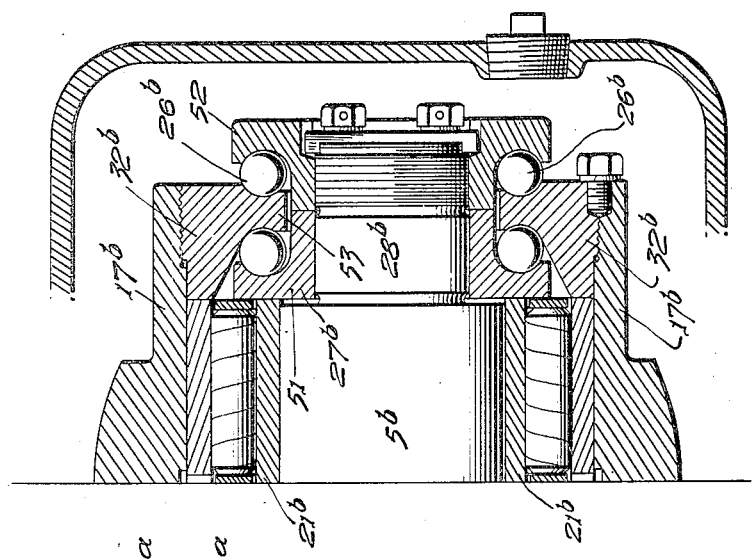
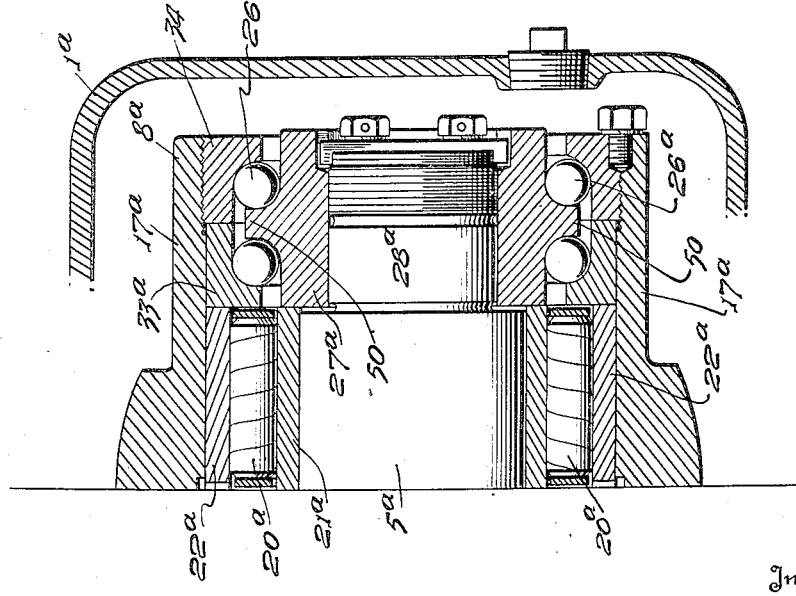
Inventor
Glenn F. Couch
By
Attorney Patented July 17, 1934

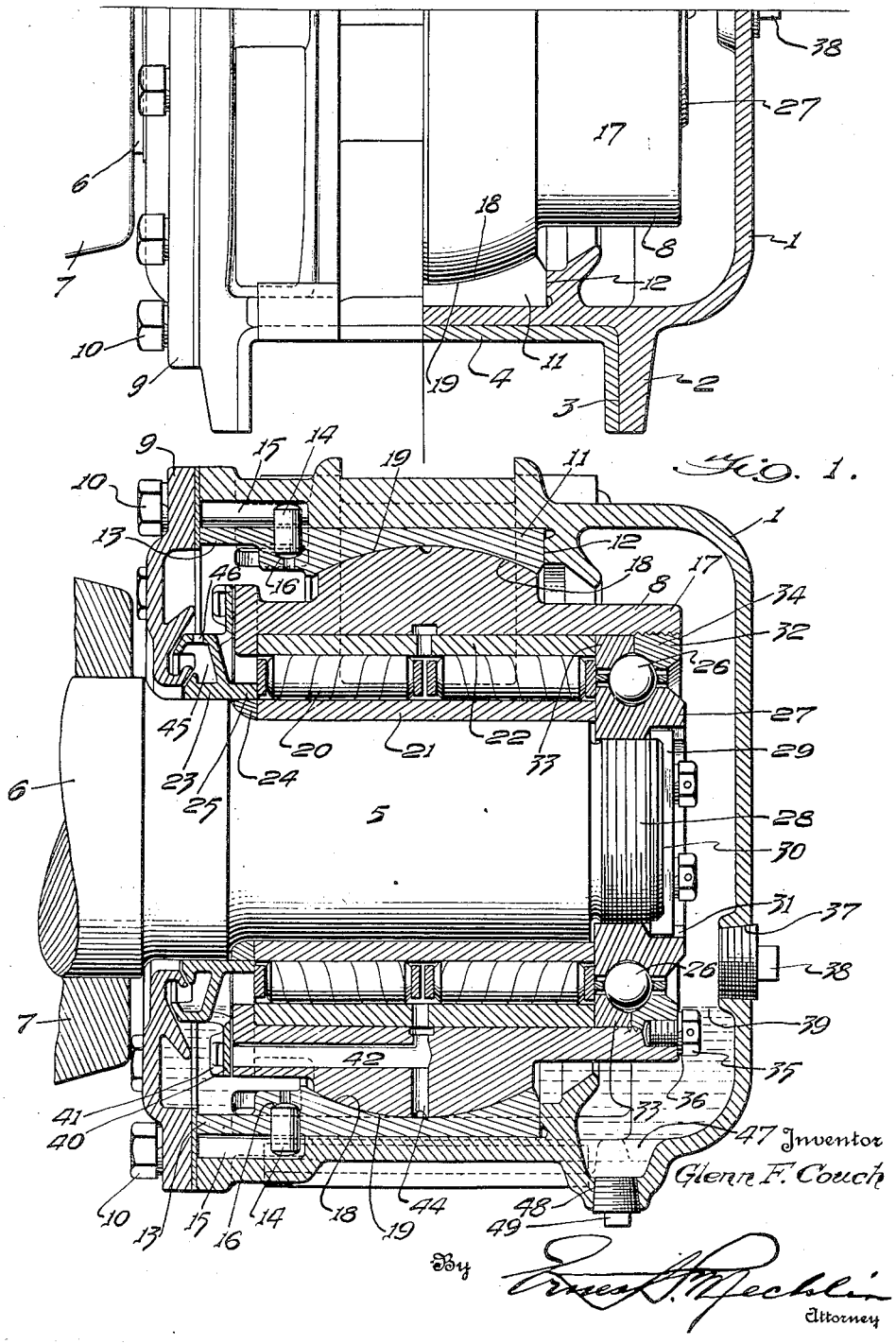

1,966,924

UNITED STATES PATENT OFFICE 1,966,924

JOURNAL BOX

Glenn F. Couch, Rochester, N. Y., assignor to The Symington Company, New York, N. Y., a corporation of Maryland Application November 11, 1929, Serial No. 406,425

12 Claims. (Cl. 308—180)

This invention relates to journal boxes and more particularly to such provided with roller bearings and mounted for equalization with respect to an associated journal.

The principal object of my invention, generally considered, is to provide a journal box with roller bearings serving to carry the main load, and ball bearings functioning as means for taking any axial thrust, said box being provided with means to permit equalization with respect to the enclosed journal.

Another object of my invention is to provide a roller bearing journal box receiving an outer concave equalizing ring cut in two to permit assembly and each half carrying an extension against which the rear cover of the box bears to hold it in place, means being provided to prevent said ring from turning and preferably involving floating dowels riding in grooves in the main housing with the other ends received in said ring.

A further object of my invention is to provide a roller bearing journal box assembly in which the box or front portion thereof may be readily withdrawn or removed for inspection of the rollers.

A still further object of my invention is to provide a roller bearing journal box assembly including both cylindrical rollers, for taking the main load, and balls forming, in effect, a thrust bearing.

An additional object of my invention is to provide an improved roller bearing journal box in which the parts are so arranged that circulation of the oil or other lubricant to all parts of the bearing is provided for.

Another object of my invention is to provide a journal box enclosing a journal with roller and ball bearing means therebetween, and improved locking devices for holding the bearing elements in place on the journal and outer bearing element.

Other objects and advantages of the invention relating to the particular arrangement and construction of the various parts will become apparent as the description proceeds.

Referring to the drawings illustrating my invention, the scope whereof is defined by the appended claims.

Figure 1 is a transverse sectional view of a journal box and roller bearing assembly, the associated journal being shown in side elevation.

Figure 2 is a plan of the box shown in Figure 1, a portion of said box being broken away to show the enclosed roller bearing assembly.

Figure 3 is a partial end elevation and partial transverse sectional view of the roller bearing journal box assembly shown in Figures 1 and 2.

Figure 4 is a fragmentary view corresponding to Figure 1, but showing a modification.

Figure 5 is a fragmentary view also corresponding to Figure 1, but showing another modification.

Referring to the drawings in detail, like parts being designated by like reference characters, and first considering the embodiment of my invention illustrated in Figures 1, 2 and 3, there is shown a journal box 1, which, in the present embodiment, has outstanding flanges 2 providing channels 3 on either side thereof, which channels may be lined with wear plates 4 and adapted to engage the legs or depending portions of a truck pedestal (not shown). Received in the journal box is a journal 5 extending from an axle 6 on which may be mounted wheels 7, only a fragmentary portion of one of which is shown. Although only one end of the axle 6 is shown, it will be understood that the other end may be of similar construction and associated with a similar journal box.

Disposed between the journal 5 and the box 1 is a roller bearing assembly 8. For closing the annular space between the journal 5 and box 1, a rear journal box cover 9 is provided and desirably connected to the box by means of bolts 10 with a gasket for making said assembled box oil tight. In order to permit equalization between the box and roller bearing assembly, an outer equalizing ring 11 is provided, the outer surface of which fits the inner surface of the box with its outer edge preferably engaging a shouldered portion 12 on the box, and its inner edge or an extension thereof 13 being engaged by the inner wall 9 or gasket to hold it securely in place. In order to permit assembly of the equalizing ring 11 with respect to the roller bearing assembly, said ring is formed in two or more pieces. In order to prevent turning of the ring, floating dowels 14 are desirably provided riding in grooves 15 in the box or main housing 1 with their other ends received in pockets 16 in the ring 11.

The inner element 17 of the equalizing arrangement forms the outer element of the roller bearing assembly and is preferably provided with a convex spherical portion 18 fitting the concave spherical portion 19 of the equalizing ring 11, so that a limited amount of equalization is permitted therebetween. The rollers 20, which, in the present embodiment are cylindrical, are preferably disposed between an inner bushing 21 mounted directly on the journal 5, and an outer bushing 22 fitting the inner surface of the inner equalizing element 17. Before applying the inner bushing 21 to the journal, an oil throwing ring and impeller 23 is desirably securely applied to said journal, as by being shrunk thereon, and a ring 24 applied over the journal 5 and under the outwardly extending flange 25 of the oil thrower 23. The bushing 21 may then be applied over the journal 5, the rollers 20 applied therearound, and the outer bushing disposed around said rollers and fitting the inner surface of the inner equalizing ring 17.

In order to take up end thrust between the journal and box, a ball bearing assembly with balls 26 may be disposed on the end of the journal, said assembly comprising an inner ring or raceway 27, preferably threadably mounted on the reduced end portion 28 of the journal, and serving to lock the inner bushing 21 on the journal 5. The ring 27 is preferably securely locked in place as by means of a tap bolt and lock washer secured retainer bar 29 fitting in a notch or groove 30 in the end of the reduced portion 28 of the journal and with its ends received in notches or pockets 31 in said ring.

The outer ball ring or raceway 32 is preferably formed in two parts to facilitate assembly, the inner part 33 fitting against the outer end of the outer bushing 22 and the inner surface of the equalizing element 17 and being held in place by the outer part 34 preferably threadably secured to the equalizing element 17 and desirably locked in place by tap bolts 35 provided with locking washers 36.

The journal box is desirably provided with an oil filling hole 37 closed by a plug 38 and the oil level is desirably maintained at or near the lower edge of the filling hole 37, as indicated at 39. In order to provide for circulation of the oil or other lubricant throughout the parts of the bearing, the oil thrower 23 is desirably provided with extensions 40 having crimped edges or vanes 41 serving as impellers for drawing the oil through the oil passage 42. It will be clear that the suction created in the passage 42 by the rotation of the impeller blades 41 past it will cause oil to be drawn through the rollers 20 and balls 26, equalization of the oil pressure between the inner and outer ends of the journal box being permitted by passages 43 between the ends of said box. An extension 44 of said oil passage 42 is desirably provided to the outer spherical surface 18 of the equalizing ring 17, to thereby provide for adequate lubrication at the equalizing surfaces.

In order to provide a seal against the loss of oil from the inner or back portion of the box along the journal, the oil thrower ring 23 has a trough shaped portion 45 provided with apertures 46, which portion, when the journal is in motion, serves to collect oil which would have a tendency to escape past the journal and through the back wall of the box and throws it back into the box through the holes 46. Of course, it will be understood that when the journal is not turning, the oil level is preferably below the inner periphery of the inner wall 9 of the box so that it would not have a tendency to run out until stirred up by movement of the journal. In order to provide for draining the box for the removal of sediment or renewal of oil, a sump 47 is provided and the wall of the box therebeneath is apertured, as indicated at 48, and closed by a plug or other closure means 49. In order not to interfere with free equalization of the journal in the box, the adjacent surfaces on the inner wall 9 of the box and the oil thrower 23 are formed substantially concentric with the curved or spherical surface 18 on the equalizing ring 17.

Referring now to the embodiment of my invention illustrated in Figure 4, a construction is there disclosed which is similar to that of Figures 1, 2 and 3, that is, the box 1$^a$ has equalizing means for the outer ring or element 17$^a$ of a combined roller and ball bearing assembly 8$^a$. The rollers 20$^a$ are disposed, as in the previous embodiment, between bushings 21$^a$ and 22$^a$, the former of which is directly mounted on the journal 5$^a$ which has a reduced threaded extension 28$^a$ upon which is mounted the inner element 27$^a$ for the balls 26$^a$. In the present embodiment, instead of having only one ring of balls serving to take end thrust, two rings are provided separated by an outwardly extending flange or projection 50 on the inner element 27$^a$ of the ball bearing. As in the previous embodiment, the outer element or ring of the ball bearing is formed in two parts, an inner part 33$^a$ and an outer part 34$^a$ threaded into the equalizing ring 17$^a$. Locking means for the ball bearing rings 27$^a$ and 34$^a$ may be provided as in the previous embodiment. Except as specifically described in connection with the present embodiment the construction may correspond substantially with that of the first embodiment.

Referring now to the embodiment of my invention illustrated in Figure 5, a construction is there disclosed which may be identical with the embodiment shown in Figure 4, except that the inner ball bearing element 27$^b$ is formed in two parts 51 and 52, the former of which abuts the inner roller bearing element 21$^b$ and the outer element 52 of which is threaded to an extension 28$^b$ on the journal 5$^b$. The two rings of balls 26$^b$ are disposed between an inner extension or flange 53 on the outer ball bearing element 32$^b$, which element is threaded to the equalizing ring 17$^b$, and the inner ball bearing parts 51 and 52. Except as specifically described in connection with the present embodiment, the construction may correspond substantially with that of the first embodiment.

From the foregoing disclosure it will be seen that I have devised an improved roller bearing journal box particularly adapted for use on railway rolling stock and allowing for free equalizing within the desired limits. It will also be seen that not only is provision made for taking the main load, but for taking the end thrust or axial load. I have also provided means for causing the lubricant to circulate freely through the balls and rollers, a connection also being provided to the spherical equalizing surfaces, whereby the same are always maintained adequately lubricated to permit free equalization. On account of the connection between the outer equalizing ring and the journal box or main housing thereof, I am enabled to remove said main housing for the inspection of the bearing upon taking out the bolts which secure the inner cover to the box.

Although I have disclosed preferred embodiments of my invention, it will be understood that the same are merely illustrative and that modifications may be made within the spirit and scope of my invention as defined by the appended claims.

Having now described my invention, I claim:

1. In combination, a journal box, a journal therein, an equalizing ring presenting an inwardly concave surface, cylindrical roller bearing main load taking means, and ball bearing means at one end of said roller bearing means for taking the axial thrust between said journal and box, both of said roller and ball bearing means having a single outer element with a convex surface fitting the concave surface of the equalizing ring.

2. In combination, a journal box, a journal therein, cylindrical roller bearing means disposed between said journal and box, means providing for equalization of the outer element of said roller bearing means with respect to said box, and ball bearing means disposed between the end of said journal and the outer element of said roller bearing means.

3. In combination, a journal box, a journal therein, a back cover for said box closing the space between said box and journal, an equalizing ring formed in a plurality of parts and received in said box and held in place between a shouldered portion on said box and said cover, said equalizing ring presenting an inwardly concave spherical surface, and cylindrical roller bearing means disposed between said journal and box, the outer element of said bearing means having a convex spherical surface fitting the concave spherical surface of the equalizing ring to permit equalization between said journal and box.

4. In combination, a journal box, a journal therein, a back cover for closing the space between said journal and box, means connecting said cover and box, an equalizing ring formed in two parts and presenting an inwardly concave spherical surface, said ring being received in said box and carrying an extension against which the cover bears, that portion of said box overlying said extension being formed with grooves, floating dowels extending from said equalizing ring into said grooves for preventing turning of said ring, cylindrical roller bearing means disposed between said journal and box, the outer element of said bearing means having a convex spherical surface fitting the concave spherical surface of the equalizing ring to permit equalization between said journal and box, and ball bearing means disposed between said journal and box for taking care of end thrust.

5. In combination, a journal box, a journal therein, a cover closing the space between said journal and box, cylindrical roller bearing means disposed between said journal and box, and means for sealing the space between said cover and journal comprising an oil thrower mounted on said journal and formed with an outer trough-like portion for catching oil and perforations for discharging oil therefrom when the journal is in motion.

6. In combination, a journal box, a journal therein, a cover for said box, bearing means between said journal and box, said bearing means having an oil circulating passage therethrough, means sealing the space between said cover and journal, said means being provided with an extension serving as an oil impeller for causing oil to circulate through said oil passage in the bearing.

7. In combination, a journal box, a journal therein, roller bearing means disposed between said journal and box, said means being provided with an oil passage leading from the inner edge to the central portion of said bearing means, and means for causing a circulation of oil through said passage comprising an impeller mounted on said journal and adapted to rotate past the inner end of said oil passage when the journal is in motion to draw oil from the interior of said bearing, said box being provided with passages connecting the front and rear ends of said box for the return of said oil.

8. In combination, a journal box, a journal therein, a back cover for said box closing the space around said journal, cylindrical roller bearing means disposed between said journal and box and comprising an outer element with an oil passage from an interior portion to an inner surface thereof, an inner element mounted on said journal, and a centrifugal oil impeller mounted adjacent said passage inwardly of said inner element from the outer end of said journal and formed with means for centrifugally drawing oil through said passage from the interior of said bearing to cause a circulation therethrough when the journal is in motion.

9. In combination, a journal box, a journal therein, cylindrical roller bearing means disposed between said journal and box, means providing for equalization of the outer element of said roller bearing means with respect to said box, ball bearing means disposed between the end of said journal and outer element of said roller bearing means, and means mounted on the end of said journal for locking said roller and ball bearing means in place.

10. In combination, a journal box, a journal therein, cylindrical roller bearing means disposed between said journal and box and comprising a bushing mounted on said journal, an extension on the end of said journal, a bushing threaded on said extension and adapted to be tightened to hold the first mentioned bushing in place and to serve as an inner raceway for a ball bearing, an outer element for said roller bearing with an extension overlying the extension on the journal, means threadably connected to said extension to serve as an outer ball raceway, and balls disposed between said inner and outer raceway to take care of end thrust between said journal and box.

11. In combination, a journal box, a journal therein, cylindrical roller bearing means disposed between said journal and box and comprising a bushing mounted on said journal, an extension of reduced diameter on the end of said journal, bushing means threadably connected to said extension and adapted to be tightened to hold the first mentioned bushing in place and to function as an inner raceway for a ball bearing, said roller bearing means having an outer element with an extension overlying the journal extension, bushing means threadably connected to said extension to function as an outer ball raceway, flange means extending from one of said ball raceway means toward the other, and balls disposed on either side of said flange means to function as a thrust ball bearing for said journal.

12. In combination, a journal box, a journal therein, cylindrical roller bearing means for taking the main load and disposed between said journal and box, said bearing means comprising a bushing mounted on said journal, said journal having an extension of reduced diameter disposed beyond said bushing, bushing means connected to said extension and serving to hold the first-mentioned bushing in place and function as an inner raceway for a ball bearing, said roller bearing means having an outer element with an extension overlying said journal extension, bushing means connected to said extension to serve as an outer ball raceway, means extending from one raceway toward the other, and a series of balls disposed on each side of said means to make a thrust ball bearing for said journal.

GLENN F. COUCH.